(12) United States Patent
Topcu

(10) Patent No.: US 8,701,221 B2
(45) Date of Patent: Apr. 22, 2014

(54) WATER TANK INSTALLATION SYSTEM

(75) Inventor: Birol Topcu, Istanbul (TR)

(73) Assignee: Eczacibasi Yapi Gerecleri Sanayi ve Ticaret Anonim Sirketi, Istanbul (TR)

( * ) Notice: Subject to any disclaimer, the term of this patent is extended or adjusted under 35 U.S.C. 154(b) by 0 days.

(21) Appl. No.: 13/818,891

(22) PCT Filed: Sep. 3, 2010

(86) PCT No.: PCT/EP2010/062956
§ 371 (c)(1),
(2), (4) Date: Feb. 25, 2013

(87) PCT Pub. No.: WO2012/028201
PCT Pub. Date: Mar. 8, 2012

(65) Prior Publication Data
US 2013/0152294 A1 Jun. 20, 2013

(51) Int. Cl.
*E03D 11/00* (2006.01)

(52) U.S. Cl.
USPC .......................................................... 4/417

(58) Field of Classification Search
USPC .......................................... 4/417; 403/43, 47
See application file for complete search history.

(56) References Cited

U.S. PATENT DOCUMENTS

| | | | |
|---|---|---|---|
| 3,448,466 A | * | 6/1969 | Haldopoulos ..................... 4/417 |
| 5,457,384 A | | 10/1995 | Alfors |
| 6,357,953 B1 | | 3/2002 | Ballantyne |
| 2003/0068210 A1 | | 4/2003 | Pountney |

FOREIGN PATENT DOCUMENTS

| | | |
|---|---|---|
| DE | 202007008152 U1 | 8/2007 |
| DE | 102006034463 B3 | 1/2008 |
| EP | 1503088 A1 | 2/2005 |
| FR | 2795782 A1 | 1/2001 |

OTHER PUBLICATIONS

International Search Report for corresponding International Application No. PCT/EP2010/062956.

* cited by examiner

*Primary Examiner* — Tuan N Nguyen
(74) *Attorney, Agent, or Firm* — Egbert Law Offices, PLLC

(57) ABSTRACT

An installation system comprises a guide bolt, which is fastened to the toilet bowl and which comprises a slot which extends throughout the bolt, and a fastening element that secures the said bolt. The installation system comprises an installation element comprising a large diameter socket and a small diameter socket. The installation element is screwed to guide bolt through its large diameter socket. Passing through a hole on the water tank and a slot, a bolt is screwed into the small diameter socket of the element. The installation system ensures that the water tank is uninstalled from and installed to the toilet bowl without removing the toilet bowl from where it is installed.

8 Claims, 1 Drawing Sheet

WATER TANK INSTALLATION SYSTEM

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to an installation system that enables easy installation and uninstallation of the water tanks installed on the toilet bowls.

2. Description of Related Art Including Information Disclosed Under 37 CFR 1.97 and 37 CFR 1.98.

Water tanks of toilet bowls in the prior art are preferably secured on the water tank mounting area that is provided on the toilet bowl by utilizing the installation holes provided on the water tank and water tank mounting area. The installation holes in question extend to the lower section of the mounting area. The lower section of the mounting area cannot be reached after installation since side walls covers the lower section, and the toilet bowl is usually secured to the ground in such a way that the toilet bowl will be adjacent to a back wall. Therefore, the water tank should be installed before the toilet bowl is installed according to the installation systems of the prior art.

In the case that the installation is made according to the known installation system, it is required that the toilet bowl is completely separated from where it is installed in order to remove the water tank. Separating the toilet bowl from where it is installed is a time consuming procedure in which the drain pipe of the toilet bowl needs to be removed and the risk of damaging the toilet bowl is high.

The patent document No U.S. Pat. No. 3,448,466 A, which discloses one of the embodiments related to the solution of the said problem, uses a threaded stud for fastening a toilet bowl to its water tank. The said stud is inserted into the installation holes on said tank and said bowl, and the stud is tightened by nuts at both ends, and the installation is done. The said embodiment does not offer a solution for the studs to remain in the installation holes in the case that the water tank is again removed after the installation of the toilet bowl. Thus, no solution is offered for the said problem.

The patent document No U.S. Pat. No. 2,927,496 A discloses another embodiment related to the solution of the said problem. In the said embodiment, a stem head extends in at least one axis different from the longitudinal axis of the stem. One more slot is formed on the extended head and two stems arranged in such manner are inserted through the slots on their heads such that the stems extend in opposite directions. Mounted on at least one stem, the nut clamps the stems. By using the bidirectional stem structure, the water tank is installed onto the toilet bowl by means of the nuts. During uninstallation of the water tank, the stems, thanks to the plate structure, remain installed on toilet bowl when the nuts in the water tank are removed. The said embodiment ensures that the water tank can be uninstalled after the toilet bowl is installed. However, the distance between the installation holes in the water tank, unlike the toilet bowls and water tanks of the prior art, should differ from the installation holes on the toilet bowl in order to utilize the developed installation system.

The patent document No DE 10 2006 034463 B3 discloses a device for fastening an add-on part and a support part apart from each other and the device has a mounting nut, comprising an internal thread of a first direction of the thread; a compensating bush comprising an external thread that is adjusted to the internal thread; and a fastening screw, wherein its screw shaft is configured so as to having an external thread of a second direction of the thread which is opposite of the first direction of the thread. The compensating bush is configured so as to having an internal sleeve comprising a head section which has an arrangement of reinforcement zones and adaptation zones, wherein reinforcement zones have a larger resistance than the adaptation zones as opposed to an expansion directed radially outward. The construction of the said embodiment having complicated structure makes the embodiment to produce costly. Beside the cost, the embodiment is not convenient to solve the related problem of installation of a toilet bowl and a water tank.

The patent document No EP 1 503 088 A1 discloses a fastening device to fix two separate members having a relative interval between each other. Said device comprising a bolt in which a male screw portion is formed at a front end side of a cylindrical shaft portion thereof and a spacer which has female screw portion engaging a male screw portion of the bolt and screw fastens with a screw of the first member side and rotates while receiving a rotation torque from the bolt and moves up to a position in which it comes into contact with a second member. In this embodiment, the root diameter of a male screw portion of the bolt is smaller than the diameter of a cylindrical shaft portion, and the inside diameter of the female screw portion of the spacer is larger than the diameter of the cylindrical shaft portion of the bolt. Consequently, the cylindrical shaft portion of the bolt can be passed through the female screw portion of the spacer even if the diameter of the cylindrical shaft portion of the bolt is not reduced in diameter by cutting processing, thereby manufacturing cost being reduced.

The patent document No U.S. Pat. No. 5,457,384 A discloses an apparatus and a method for attaching a gear tooth sensor to an object comprising a tubular portion, a canonically deformable washer, a clamping bar and a bolt. The tubular portion of the apparatus is slidably disposed within a first opening of the canonically deformable washer. The clamping bar has a second opening which is slidably receiving the tubular portion therein, and a third opening receiving the bolt. When threaded bolt is used, the canonical washer is deformed into a generally flat shape, which causes a distal end of the tubular portion to move away from a target by a predetermined distance. Thereby, an accurate set gap is formed between a magnetically sensitive component within the sensor and the teeth of the rotatable target. Such apparatus is especially made for an automobile engine rather than to use for installation of a toilet bowl and a water tank.

The patent document No U.S. Pat. No. 6,357,953 B1 discloses an automatic tolerance compensator for connecting first and second members with a space between said members, comprising a pair of connector components. First connector component is secured to one assembly and second component is threadably installed with a left hand thread into first connector component. Insertion of a threaded fastener, with a right hand thread, into the connector components to initially engage the second connector component causes relative rotation between first and second components so the second connector component advances toward and engages the second assembly member. The threaded fastener also engages the first connector component to provide a secure connection between spaced assembly members. The predetermined space between the assembly members is a failure for described problem for installation of a toilet bowl and a water tank.

The patent document No US 2003/0068210 A1 discloses an assembly for mounting two or more panels or sheets having three members; a first member is mounted into a support, a second member is threaded to the mounted first member and a third member is threaded to the second member. The second member can retain a first panel being a hole or slot located by such hole or slot on the first member. The provided hole or slot is appropriately sized and similarly the third member can retain a second panel which also has a hole or slot located by such hole or slot on the second member. The provided hole or slot is appropriately sized. The invention is designed for mounting panel or sheets, such as a poster.

The patent document No DE 20 2007 008152 U1 discloses a fastening apparatus with tolerance equalization, comprising a receiving element and an adjustment element, a fastening screw. A first thread pairing of a first thread direction is used to screw the adjustment element to the receiving element, and a second thread pairing of an opposite thread direction is used for screwing the fastening screw into the receiving element and connected with the adjustment element via a detachable drag connection. When the fastening screw is turned, the adjustment element also turns. Thereby, tolerance equalization of the receiving element and the adjustment element is provided.

The patent document No FR 2 795 782 A1 discloses a device for assembling two components exhibiting a lateral positioning set in a given direction, comprising a fixing screw which is able to move freely in a smooth through hole provided in the first component; a spacer bearing an external thread capable of co-operating with a tapped through-hole provided on the second component; and an internal tapping capable of co-operating with the fixing screw. The screw friction coefficient is greater than the tapped through-hole friction coefficient, directly or indirectly. The described invention is especially designed to solve technical problem of assembling two parts featuring lateral direction.

BRIEF SUMMARY OF THE INVENTION

The installation system developed by the present invention ensures installation of a water tank onto a toilet bowl, uninstallation and reinstallation of the water tank without uninstalling the toilet bowl from where it is installed.

The installation system developed by the present invention, winch is suitable for installing a water tank to a toilet bowl, comprises a guide bolt which is suitable for being inserted in an installation hole provided on the toilet bowl and an installation element mounted on this guide bolt. There is a slot through the guide bolt. This slot is used for inserting another bolt through the guide bolt. The guide holt is inserted into the installation hole on the toilet bowl and is secured by a fastening element, preferably. The installation element, which comprises at least two screw sockets having different diameters, is engaged on one end of the guide bolt. The installation element is engaged on the guide bolt through the screw socket having larger diameter, and the installation of the portion of the system, remaining on the toilet bowl is completed. For the installation of the water tank, a bolt is passed through an installation hole on the water tank and through the guide bolt and is screwed into the screw socket of the installation element that has small diameter. The installation of the water tank to the toilet bowl is therefore completed. In addition, said installation element is formed by engaging at least one guide nut comprising said large diameter socket and at least one nut comprising said small diameter socket with each other. Furthermore, at least one claw is provided on the guide nut and nut each, such that the said claws engage each other, whereby the installation element is secured on the guide bolt by using the guide nut. Thanks to the installation element and guide bolt features, the installation system of the present invention eases the installation of the water tank to the toilet bowl and eliminates the requirement of uninstalling the toilet bowl when removing the water tank. The firmness and water tightness of the developed installation system is ensured by using at least one washer and a sealing.

Unscrewing the bolt which has been screwed into the small diameter socket of the installation element is enough to remove the water tank from the toilet bowl. The installation element remains screwed into the guide bolt. Thus, the bolt that is used for the reinstallation of the water tank can be engaged without moving the installation element.

Thanks to the installation system developed by the present invention, there is no need to uninstall the toilet bowl in order to uninstall the water tank from the toilet bowl and reinstall it on the toilet bowl after the installation of the toilet bowl.

OBJECTIVE OF THE INVENTION

The aim of the present invention is to develop an installation system that can be used for the installation of a water tank on a toilet bowl.

Another aim of the present invention is to develop an installation system which does not require that the toilet bowl is uninstalled for removing the water tank from the toilet bowl.

Yet another aim of the present invention is to develop an installation system which enables the user to safe time during the assembly of the water tank to the toilet bowl.

A further aim of the present invention is to ensure water tightness in the installation system developed.

BRIEF DESCRIPTION OF THE DRAWINGS

The sample embodiments of the water tank installation system of the present invention are illustrated in the annexed figures wherein.

Figure 1:
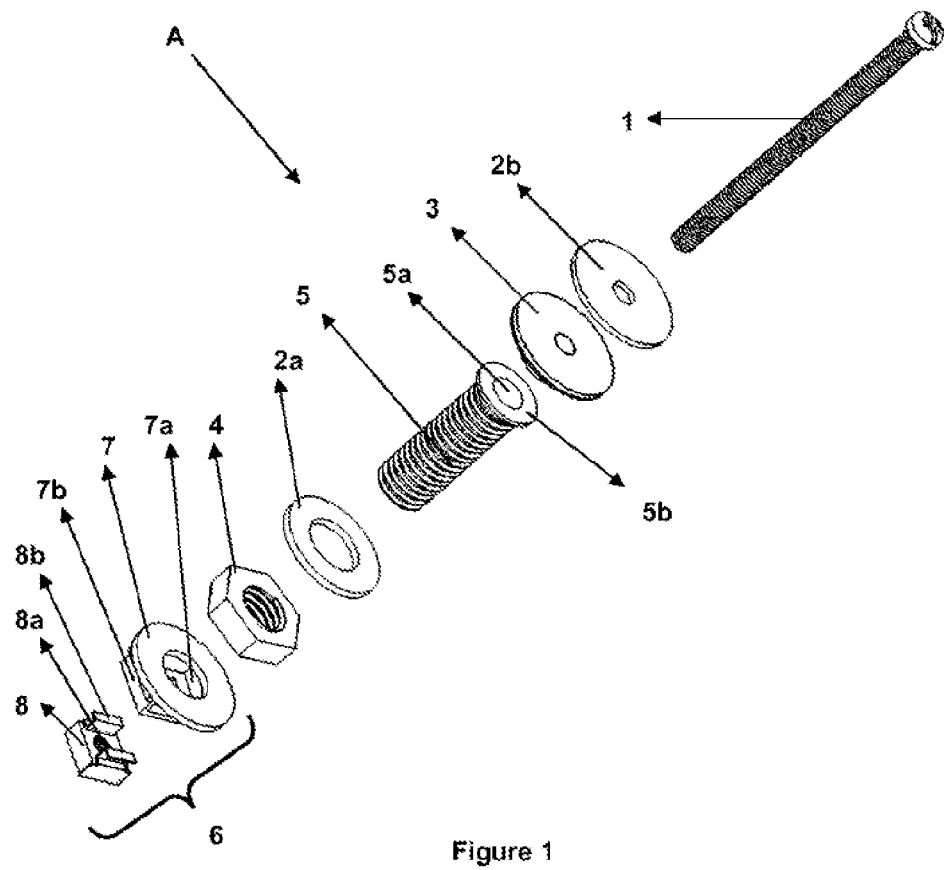
FIG. 1 is a view of the system parts before installation in an embodiment of the installation system.

The parts in the drawings are individually enumerated and the corresponding meanings of the references are as follows:

Installation system (A)
Water tank (B)
Installation hole of the water tank (B1)
Toilet bowl (C)
Installation hole of the toilet bowl (C1)
Bolt (1)
Washer (2a, 2b)
Sealing member (3)

Fastening element (4)
Guide bolt (5)
Slot (5a)
Shoulder (5b)
Installation element (6)
Guide nut (7)
Large diameter socket (7a)
Claw (7b, 8b)
Nut (8)
Small diameter socket (8a)

DETAILED DESCRIPTION OF THE INVENTION

FIG. 1 illustrates the system parts before installation in an embodiment of the water tank installation system (A) developed by the present invention. The installation system (A) comprises at least one guide bolt (5). The guide bolt (5) is inserted in at least one installation hole (C1) on the toilet bowl and is preferably secured by at least one fastening element (4) (e.g. by a nut). At least one slot (5a) is provided in the guide bolt (5) which extends throughout the bolt (5). There is preferably at least one shoulder (5b) provided at one end of the guide bolt (5) which extends in an axis different from the longitudinal axis of the bolt (5) and which ensures that the bolt (5) remains in the installation hole (C1) on the toilet bowl. As an alternative for the said shoulder (5a), a secondary fastening element (not shown in the figures) may be inserted in the said guide bolt (5), ensuring that the said holt (5) remains in the installation hole (C1) on the toilet bowl. Before the fastening element (4) is engaged, preferably at least one washer (2a) is engaged with the bolt (5) to protect the surface to which the fastening element (4) contacts.

The said installation system (A) comprises an installation element (6) comprising at least two sockets (7a, 8a) having at least two different diameters. This installation element (6) is formed by engaging at least one guide nut (7) comprising a large diameter socket (7a) and at least one nut (8) comprising a small diameter socket (8a) with each other. As an example, this installation element (6) is illustrated in the figures as a two-piece element, the pieces being at least one guide nut (7) and at least one nut (8). Furthermore, at least one claw (7b, 8b) is provided on the guide nut (7) and nut (8) each. The installation element (6) is formed by engaging the said claws (7b, 8b). The installation element (6) is secured on the guide bolt (5) by using the guide nut (7). Thanks to the installation element (6) and the guide bolt (5) features, the installation system (A) of the present invention eases the installation of the water tank (B) to the toilet bowl (C) and eliminates the requirement of uninstalling the toilet bowl (C) when removing the water tank (B).

Figure 2:
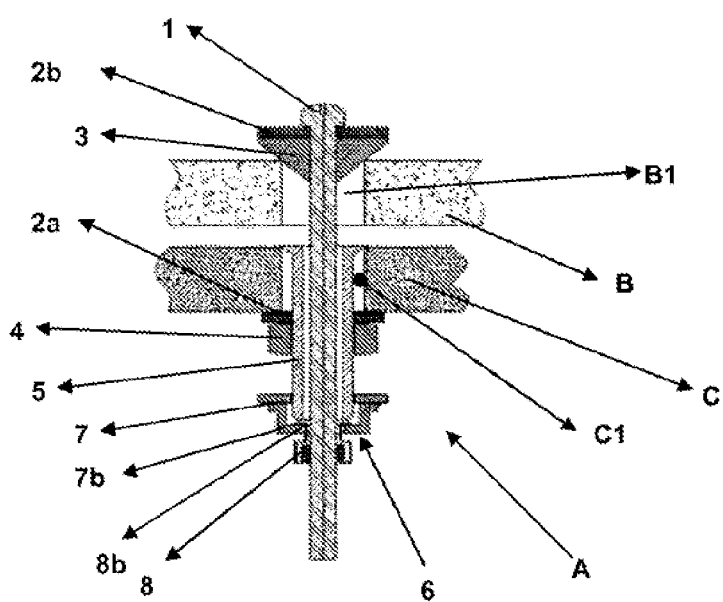
FIG. 2 is a view of the installed state of the system parts to the water tank and the toilet bowl.

When the water tank (B) (a sectional view of the water tank and the toilet bowl is shown in FIG. 2) is placed on the toilet bowl (C), at least one bolt (1) is passed through at least one installation hole of the water tank. (B1) and the slot (5a) in the guide bolt (5) and is screwed into the nut (8) provided on the installation element (6). At least one washer (2b) and/or a sealing member (3) are engaged with the bolt (1) before the bolt (1) is inserted into the installation hole of the water tank. (B1). Therefore, the stress area of the bolt (1) can be protected thanks to the washer (2b), and the water tightness of the installation hole (B1) is ensured by means of the sealing member (3). The sealing member (3) is preferably conical.

FIG. 2 illustrates a sample installation system (A) installed on the toilet bowl (C) and water tank (B). For the installation, the guide bolt (5) is at first inserted into the installation hole (C1) on the toilet bowl (C) and is secured by means of a fastening element (64) and preferably a washer (2a). Then, the installation element (6) is secured to the guide bolt (5) by the guide nut (7). Thus, the toilet bowl (C) is ready for the installation of the water tank. Next, the water tank (B) is placed on the toilet bowl (C), and a bolt (1), preferably with a washer (2b) and a sealing member (3), is passed through the installation hole (C1) on the toilet bowl (C) and the guide bolt (5) by means of the installation hole of the water tank (B1) and is screwed into the nut (8) provided on the installation element (6).

Thanks to the installation system (A) developed by the present invention, it is sufficient to unscrew the bolt (1) which has been passed through the installation hole (B1) on the water tank (B) in order to remove the water tank (B) from the toilet bowl (C). When the bolt (1) is unscrewed, the installation element (6), to which the bolt (1) is screwed, retains its position since it is secured to the guide bolt (5) by means of the guide nut (7). Thus, during the reinstallation of the water tank (B) to the toilet bowl (C) when the bolt is passed through the installation hole of the water tank (B1) and the guide bolt (5), the bolt (1) can be easily screwed to the installation element. In this manner, the uninstallation and reinstallation of the water tank (B) is ensured without performing any other procedure on the toilet bowl (C).

The invention claimed is:

1. An installation system for installing a water tank to a toilet bowl comprising;
   at least one guide bolt which is suitable for being inserted in an installation hole provided on the toilet bowl and which comprises at least one slot;
   at least one installation element which comprises at least two screw sockets having different diameters and which is to be secured to the guide bolt through the large diameter screw socket;
   at least one bolt which is to be screwed to the small diameter screw socket of the installation element by passing through at least one installation hole provided on the water tank and the said slot
   characterized in that;
   said installation element is formed by engaging at least one guide nut comprising said large diameter socket and at least one nut comprising a small diameter socket with each other; and
   at least one claw is provided on the guide nut and nut each, such that the said claws engage each other, whereby the installation element is secured on the guide bolt by using the guide nut.

2. An installation system according to claim 1 characterized in that the said guide bolt comprises at least one shoulder which extends in an axis different from the longitudinal axis of the bolt.

3. An installation system according to claim 1 characterized by comprising at least one washer which is engaged with the said guide bolt.

4. An installation system according to claim 1 characterized by comprising at least one washer which is engaged with the said bolt.

5. An installation system according to claim 1 characterized by comprising at least one sealing element which is engaged with the said bolt.

6. An installation system according to claim 5 characterized in that the said sealing element is conical.

7. An installation system according to claim 1 characterized by comprising at least one fastening element which secures the said guide bolt to the installation hole of the toilet bowl.

8. An installation system according to claim 1 characterized by comprising at least one other fastening element which keeps the guide bolt in the installation hole of the toilet bowl.

* * * * *